Aug. 3, 1926.

P. G. LEONARD 1,594,622

ROD PULLING DEVICE

Filed Jan. 7, 1925  2 Sheets-Sheet 1

Witnesses:
Margaret Auer
J. D. Stuwe

Inventor:
Peter Gustaf Leonard,
By Joshua H. Ben
his Attorney.

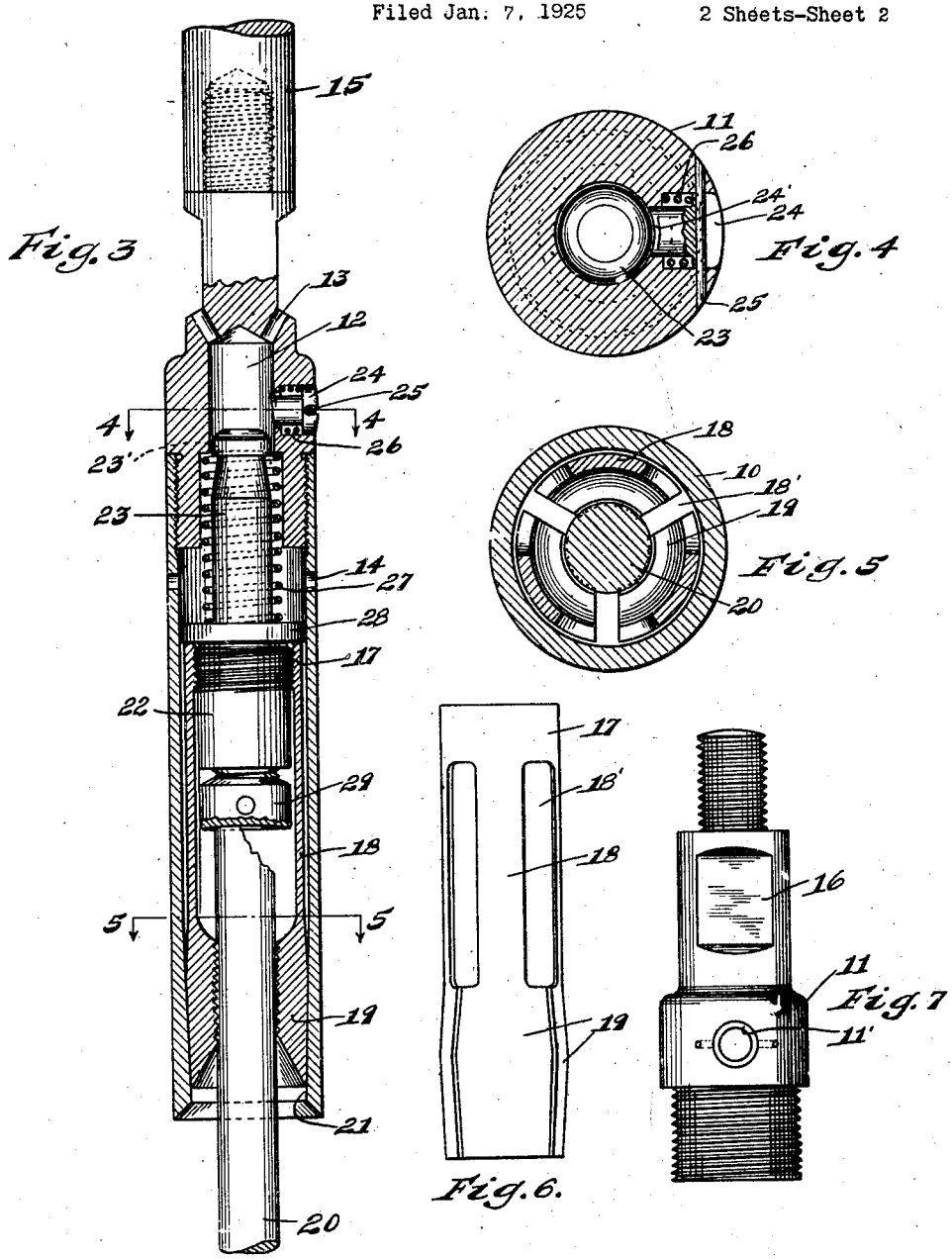

Patented Aug. 3, 1926.

1,594,622

UNITED STATES PATENT OFFICE.

PETER GUSTAF LEONARD, OF WEST TULSA, OKLAHOMA.

ROD-PULLING DEVICE.

Application filed January 7, 1925. Serial No. 994.

My invention relates to rod pulling devices, especially such a device which is adapted for gripping and pulling broken sucker rods from oil wells; and an object of the invention is to provide such a device with the gripping elements arranged in one integral piece. Another object is to provide means for conveniently releasing the rod from the device after said rod and device have been drawn to the top of the ground. And another object is to provide a construction in which the integral gripping means is firmly connected to a member adapted to carry and move said means and which member extends to a locking device for locking the member and gripping means in released position.

Other objects will appear hereinafter.

The invention consists in the combinations and arrangements of parts hereinafter described and claimed.

The invention will be best understood by reference to the accompanying drawings forming a part of this specification, and in which, Fig. 1 is an elevational view of the device;

Fig. 3 is a similar longitudinal section, showing the rod gripping means in its active rod gripping position;

Figure 1:
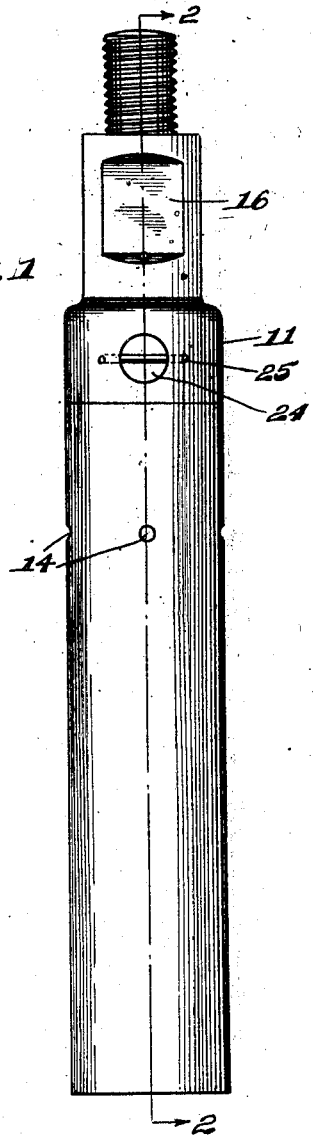

Figs. 4 and 5 are transverse sections taken respectively on lines 4—4 and 5—5 of Fig. 3.

Fig. 6 is an elevational view of the gripping means or slips all constructed integral; and Fig. 7 is an elevational view of the upper attaching member for attaching the device to a suitable instrument or member for operating the same in an oil well.

The form of invention illustrated in the drawings comprises an outer housing member or casing consisting of a cylindrical member or barrel 10 and an attaching member 11 threaded or removably mounted at the upper end of member 10 and provided with an inner bore or chamber 12 having an enlarged lower portion 12' opening into the cylindrical member. The upper end of attaching member 11 is provided with oil holes 13 leading into the top of chamber 12, and the cylindrical member is provided with similar suitable oil holes 14. The top of member 11 is threaded for attachment to a lifting or operating member, as indicated at 15, and flattened engaging portions 16 are also provided at the opposite sides of member 11 for engagement by suitable tools.

The gripping means or mechanism is constructed in one piece, and preferably includes a collar 17 with gripping elements or slips made integral with the collar and consisting of similar shanks 18 which are formed by cutting away portions to provide spaces 18', and said shanks have enlarged portions or gripping jaws 19 at their lower ends provided with transversely extending ridges or teeth on the inside for engaging and biting into a rod 20, as shown in Fig. 3, to grip or clamp the rod between said elements 19 within the device as said elements move downwardly in barrel 10 and are forced inwardly between inwardly bevelled or thickened lower portion 21 of said barrel.

Figure 2:
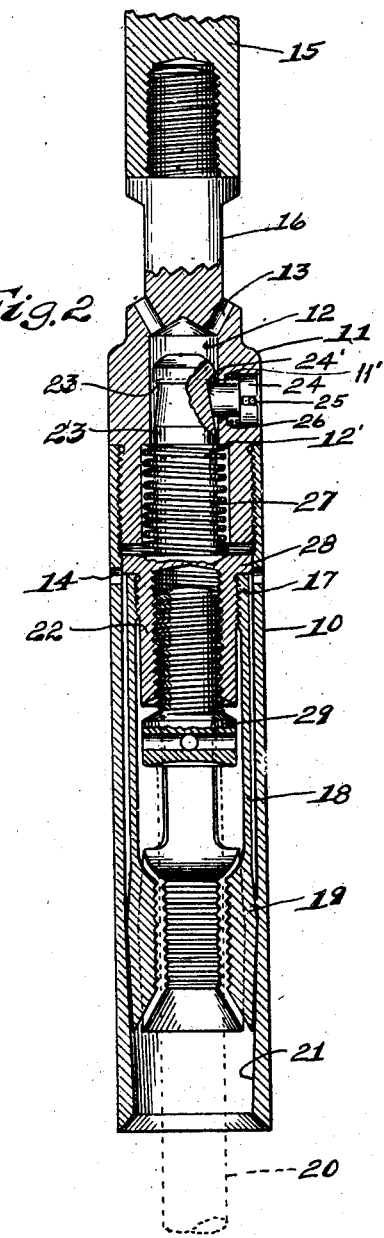
Fig. 2 is a longitudinal section taken on line 2—2 of Fig. 1, showing the gripping means in released position.

The means for locking the gripping means in released position, and for carrying and automatically moving it to operative position when unlocked, comprises a carrying member which contains a lower tubular member 22, threaded or removably mounted on collar 17, and an upper stem 23 which extends to a locking means in the form of a dog 24 slidably mounted in a pocket 11' in the wall of attaching member 11, and which with its tip 24' engages beneath the under-cut ledge of a head 23' on stem 23, as shown in Fig. 2. A pin 25, mounted in the wall of member 11 extends through a groove in the head of said dog to prevent removal thereof, and a spring 26 normally retains said dog in released position, as shown in Fig. 3. A coil spring 27 is mounted on stem 23, within chamber 12' and bears on a flange 28, between the tubular portion 22 and stem 23, to automatically move the gripping means into operative or rod gripping position when the locking means is released. A removable adjusting screw 29 is threaded in the lower tubular part 22 to be engaged by the rod for moving the mechanism into released position to be locked therein by said dog 24, especially when the rod is to be withdrawn from the device, and at other times as may be found desirable.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. A rod pulling device comprising a casing, a member housed in said casing and having gripping elements mounted thereon and therewith movable in said casing, a dog mounted in the wall of said casing and having a projecting tip for engaging behind a projection on said member to hold said elements in release position, and a spring on said dog to normally move and hold said dog in retracted position upon an upward movement of said member.

2. A rod pulling device comprising a casing, a member with gripping elements mounted thereon and movable in said casing, a dog for engaging said member to hold said elements in release position, a spring on said dog for retracting it upon an upward movement of said member, and an adjustable contact element mounted at the lower end of said member to be engaged by a rod for moving said member upward.

3. A rod pulling device comprising a casing, a member slidably mounted therein, rod gripping means mounted on said member, means comprising a body arranged in the casing and movable into position for locking said member and gripping means in release position, and an adjustable contact element mounted at the lower end of said member to be engaged by a rod for moving said member upward to be locked in its release position by said movable body.

4. A rod pulling device comprising an upper attaching portion, a cylindrical member removably mounted thereon and forming a complete casing therewith, a member housed and slidably mounted in said casing, rod gripping elements constructed in a single piece and removably mounted on said member to slide therewith, a dog with a projecting tip for engaging and locking said member and therewith said gripping elements in release position, and a spring surrounding said dog for retracting and holding it in release position when said member has been moved upwards.

5. A rod pulling device comprising an upper attaching portion with a chamber therein, a cylindrical means mounted thereon and forming a casing with said chamber, a stem with a tubular portion slidably mounted in said casing, integral gripping elements removably mounted on said tubular portion, a detachable contact element adjustably mounted in said tubular portion, to be engaged by a rod for moving said portion and stem upward, a dog mounted in said upper attaching portion for engaging said stem to lock said gripping elements in release position, a spring on said dog for moving it into release position, and a spring on said stem for moving said elements into locking position upon release of said locking dog.

In testimony whereof I have signed my name to this specification.

PETER GUSTAF LEONARD.